Oct. 23, 1962 T. E. DEANE 3,059,464
INSTRUMENTED APPARATUS FOR TESTING FRICTION MATERIALS
Filed Dec. 30, 1957 4 Sheets-Sheet 1
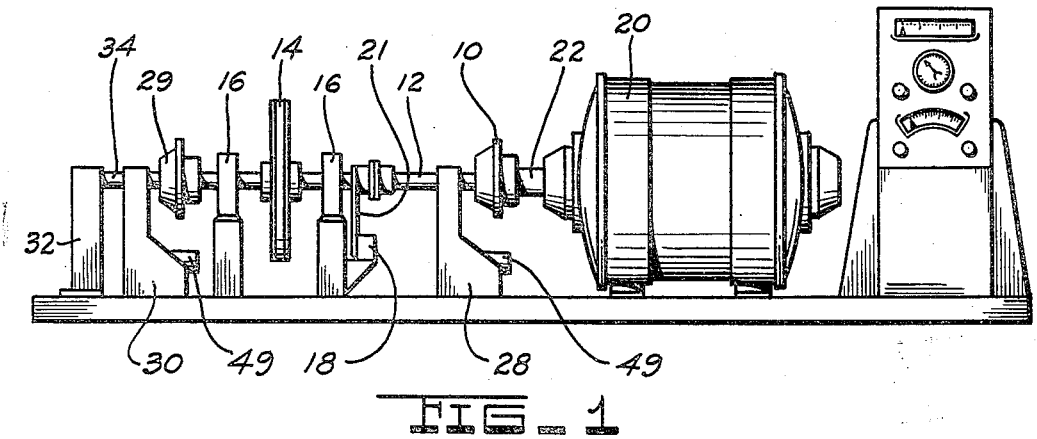
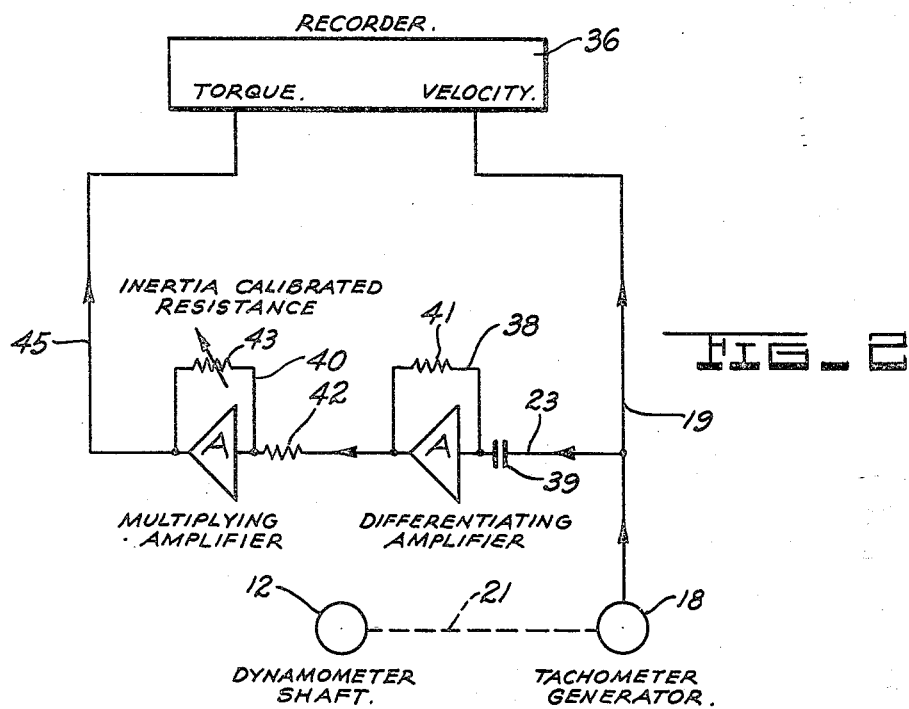
INVENTOR.
THEODORE E. DEANE.
BY
John A. Young
ATTORNEY.

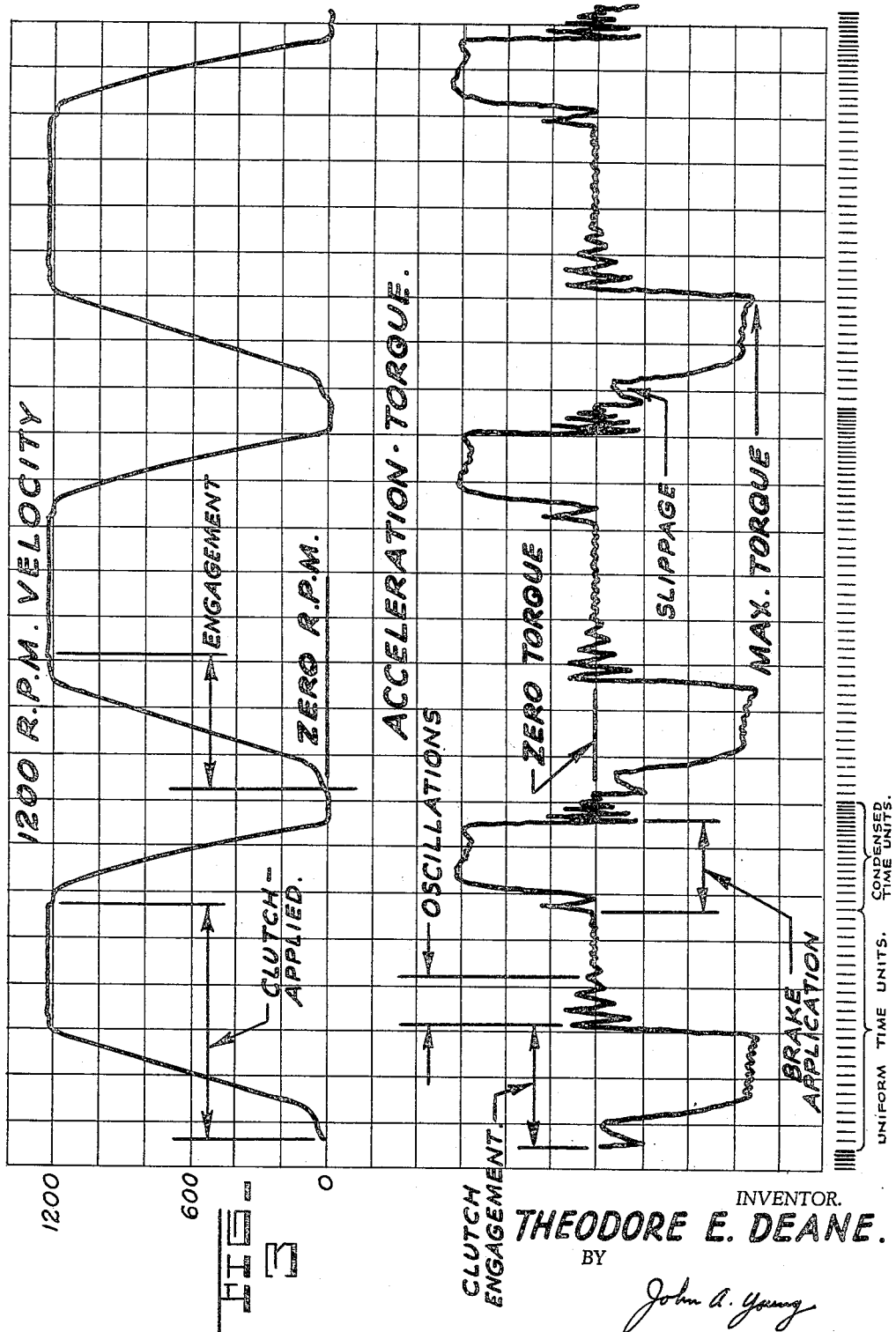

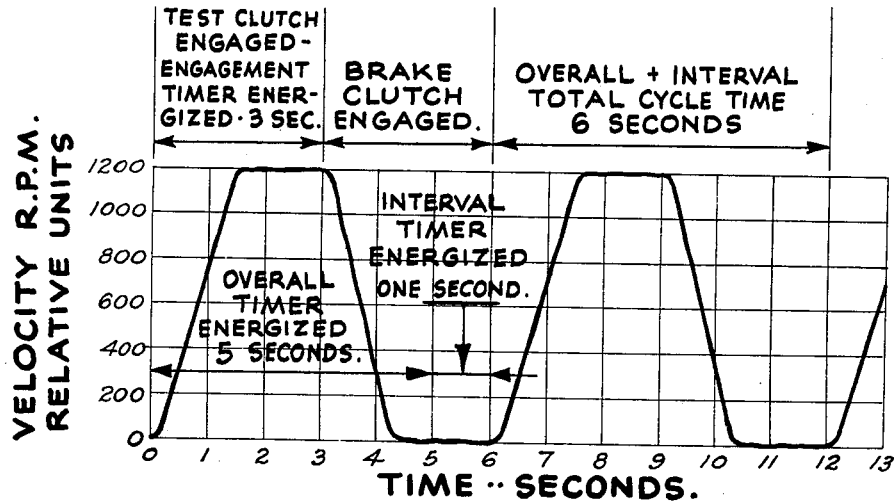
FIG_4
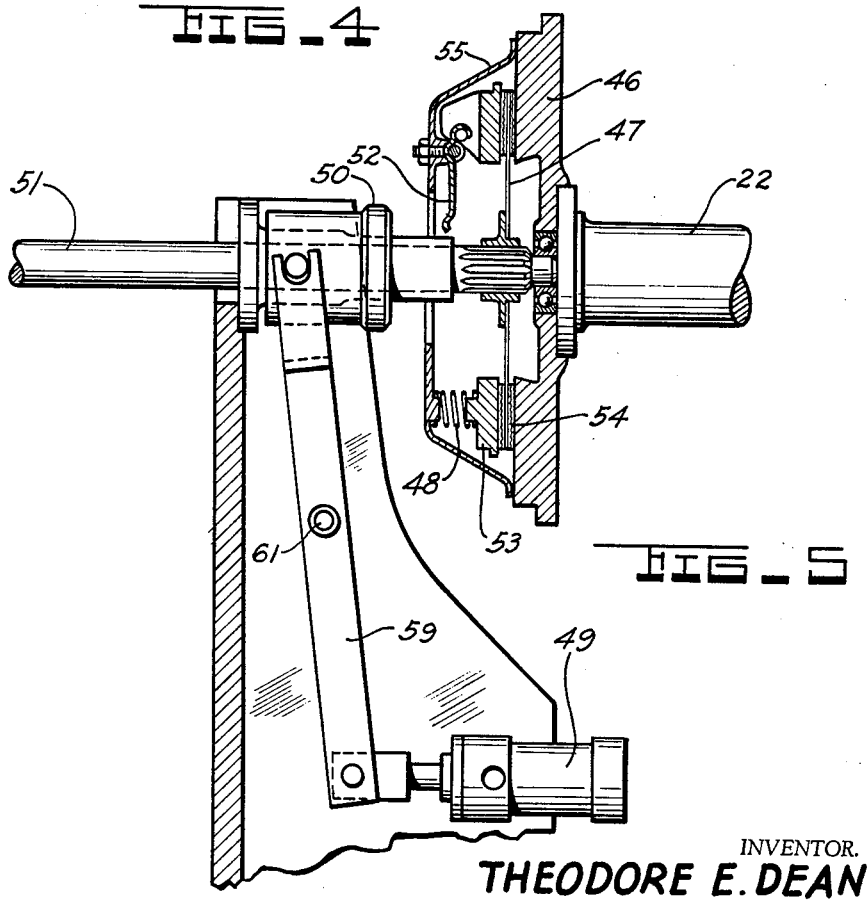
FIG_5
INVENTOR.
THEODORE E. DEANE.

INVENTOR.
THEODORE E. DEANE.

United States Patent Office 3,059,464
Patented Oct. 23, 1962

3,059,464
INSTRUMENTED APPARATUS FOR TESTING
FRICTION MATERIALS
Theodore E. Deane, Troy, N.Y., assignor to The Bendix
Corporation, a corporation of Delaware
Filed Dec. 30, 1957, Ser. No. 706,045
6 Claims. (Cl. 73—9)

This invention relates to an apparatus for testing and evaluating the physical properties of friction materials which are proposed for use in brake and clutch devices.

In order to evaluate a friction material properly, it is necessary to duplicate the actual conditions of use as nearly as possible and to obtain precise values for the torque, coefficient of friction, etc. during an application. Ideally, the data should be provided in the form of a continuous record during the application so that the characteristics of the material can be carefully studied under variously controlled conditions and then compared with other friction materials. Also, with repeated test applications, the respective histories can be compared one with the other so that the effect of continued use, increased temperature, wear and other factors can be learned.

It was previously the practice in evaluating brake or clutch friction materials to provide strain gauge devices which would measure the amount of the torque developed by the engagement of the friction material during an application. This method of instrumentation proved to have many deficiencies. In the first place, the strain gauge is quite costly and is disappointingly subject to malfunctioning. Also, the strain gauges present a difficult and delicate maintenance problem, as well as requiring the use of slip rings which introduce a wide margin of error.

It is an object of the present invention to provide both a method and an apparatus for evaluating the dynamic torque which is developed and transmitted by a brake or clutch friction specimen. The procedure includes that of continuously measuring the rotational velocity of the member which is accelerated or decelerated by the friction sample; the torque value is simultaneously determined by differentiating the rotational speed with respect to time to provide a direct value for either or both the angular acceleration or the torque in accordance with the value: $T=I\alpha$, I being the polar mass moment of inertia, and $\alpha$ being the angular acceleration. This equation is very well known and is self-explanatory.

The differentiation is performed through an application of the electro-mechanical analogy method.

A further feature of the invention is that suitable recording instruments can be provided in combination with the instruments for measuring the velocity and rate of change of velocity and these recording instruments then calibrated so as to provide a continuous graphical history of what transpires during a brake or clutch operation by way of the torque and other friction values. Thus, a record can be provided of the torque created by the friction specimen at all stages of clutch engagement, and related to the torque is the corresponding flywheel speed so that the torque may be identified at the precise stage of clutch operation. This enables one skilled in the art to obtain a clear picture of the dynamic conditions taking place during engagement and numerous valuable inferences can be drawn as to the properties of the friction material which were heretofore unkown. With this added valuable information, the designer can make recommendations for changes in either the friction material or mechanical design to correct for deficiencies which become more readily analyzable in this manner.

Another object of the invention is to provide an inertia load means, which in the process of being "spun up" or accelerated will simulate clutch operation. The inertia wheel after being "spun up" to a speed synchronous with that of the drive motor is then decelerated or braked to a stop. During both phases of the inertia means behavior, the friction materials are evaluated by the sensing and recording instruments to provide a continuous dynamic torque reading at all stages of clutch and/or brake action.

A further requirement necessarily satisfied by the present invention is a means of instrumenting the controlling cycle. Various electric timers, which are independently adjustable, are provided together with control relays and switches necessary for actuating the air cylinders, which are the final mechanism control. The means provides for both automatic and manual control.

As described, the invention is useful for obtaining information when using friction materials under either braking or clutching operating conditions.

Other objects and features of the invention will become apparent from a consideration of the following description which proceeds with reference to the accompanying drawings, wherein:

FIGURE 1 shows a side elevation of the testing apparatus arrangement;

FIGURE 2 is a wiring diagram showing schematically the computer components which are used in translating the information from the test apparatus to the recording instruments;

FIGURE 3 is an actual recording with a test sample evaluated in the apparatus arrangement of FIGURE 1;

FIGURE 4 is a velocity-time record of a friction material testing cycle with the time intervals indicated;

FIGURE 5 is a detail view of the actuator and clutch apparatus, the clutch also being used at one end of the test apparatus as the brake for decelerating the inertia means; and, FIGURE 6 is a schematic line diagram illustrating the arrangement of electrical components necessary to control the cycle of operation both manually and automatically.

Figure 6:
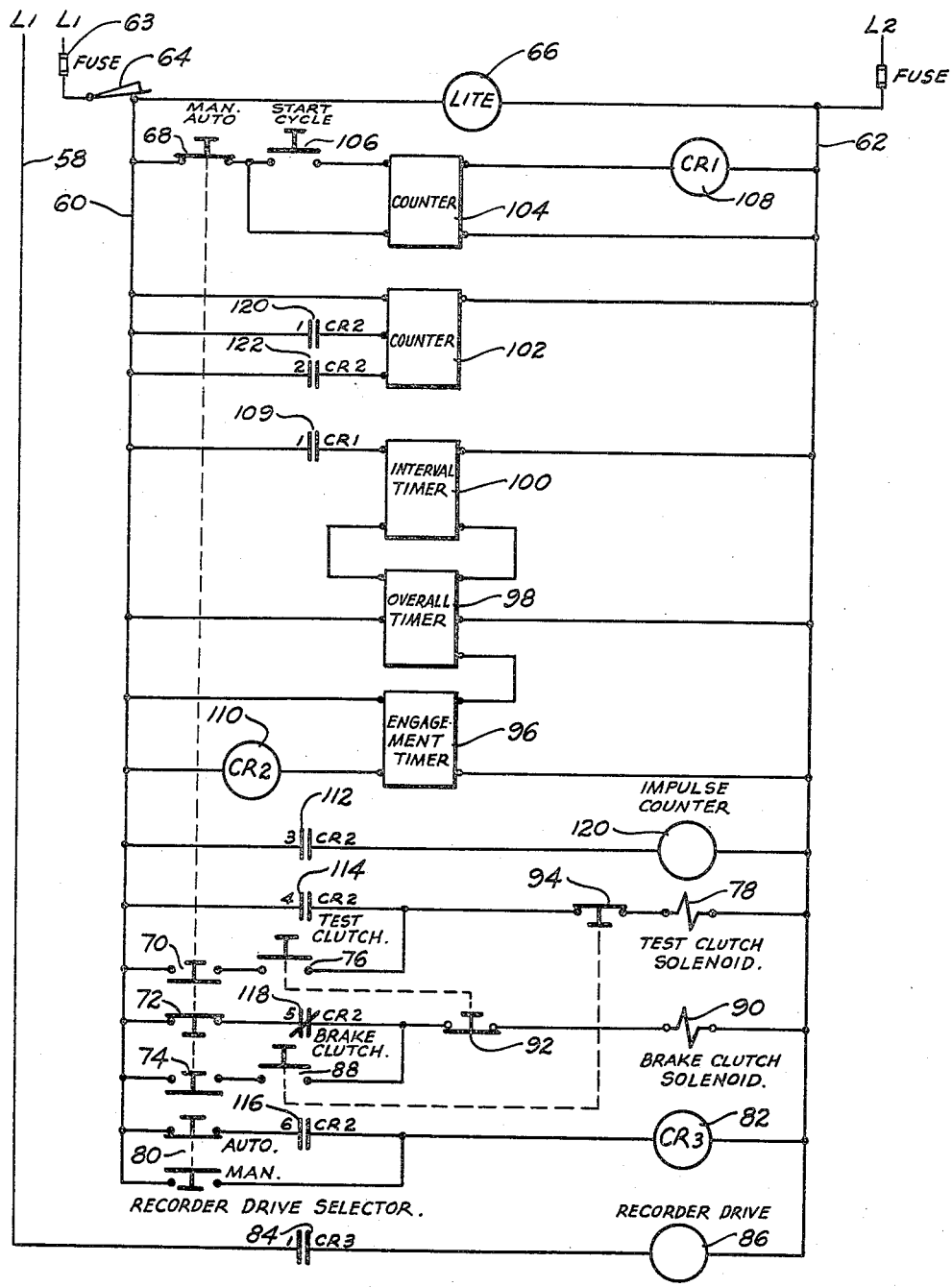

Referring to FIGURE 1, the friction liner test sample is incorporated into a torque transmitting device or clutch 10 which is connected through a dynamometer shaft 12 with an inertia wheel 14 which has a known moment of inertia. The inertia wheel 14 is supported on spaced posts 16 which journal the shaft 12 and permit free rotation of the inertia wheel 14. The inertia wheel 14 is "built up" of a number of plates and in this manner the polar mass moment of inertia can be increased or decreased to provide whatever moment of inertia is most appropriate to the proposed test samples.

Adjacent one of the supports 16 is a tachometer signal generator indicated schematically at 18. The signal generator 18 is operated by a cog belt or chain connection 21 with the dynamometer shaft 12.

At the one side of the test apparatus is a motor 20 which drives shaft 22. This shaft is fixed to the flywheel plate 46 (FIGURE 5) of test clutch 10. The spline shaft 51 (FIGURE 5) of test clutch 10 is rigidly coupled to shaft 12 and thus the components of the apparatus from clutch 10 through to the flywheel plate of the torque transmitting device or brake clutch 29 may be "spun up" to a speed synchronous with that of the drive motor 20.

In addition to support bearings 16, there is provided supports 28 and 30 directly adjacent the clutch 10 and brake 29. The purpose of these supports 28 and 30, in addition to obvious bearing points, is to uphold the solenoid operated air cylinders (49—FIGURE 5) which engage or disengage the test clutch and brake, respectively.

At the left of the apparatus is an arrangement for testing friction materials under braking as distinguished from engagement conditions. After the inertia means 14 is "spun up" by the engagement of clutch 10 and is run at synchronous speed for a preset time interval, clutch 10 is disengaged and the brake 29 is engaged bringing the inertia means 14 to zero speed.

The testing procedure is first to energize the motor 20 thus rotating shaft 22 at a constant speed, then engage test clutch 10. Engagement causes the inertia wheel 14 to "spin up" to a speed synchronous with the rotation of shaft 22.

In FIGURE 1, support 32 is fixed to shaft 34 which is integral with the spline shaft 51 (FIGURE 5) of the brake 29. Shaft 34 is fixed and does not rotate.

The inertia of the motor 20 is so large in comparison with the other components of the test apparatus that its speed is not retarded to any significant degree by the inertia of the shaft 12, inertia wheel 14 and the other components of the testing apparatus.

While the inertia wheel 14 is spinning up to speed synchronous with the motor speed, the signal generator (tachometer generator) 18 is operating off of the dynamometer shaft 12 through belt 21 as shown in the schematic, FIGURE 2. The tachometer generator 18 is calibrated so that the generated current is proportional to the angular velocity of the inertia means. Part of the signal is transmitted directly from the tachometer generator through shielded conductor 19 to a recorder 36 which traces a continuous record of the angular velocity of the inertia means.

From the tachometer generator, as can be seen, there are two conductors, one 19 leading directly from the tachometer generator to the recorder 36 to provide a history of the angular velocity; the other conductor 23 leads to a differentiating amplifier designated schematically by reference numeral 38. The differentiating amplifier includes a capacitance 39 and an in parallel resistance 41. The purpose of the differentiating amplifier is to differentiate the angular velocity with respect to time in order to obtain angular acceleration. The signal or impulse after passing through the differentiating amplifier 38 is a measure of the angular acceleration. This signal may then pass through a multiplying amplifier designated generally by reference numeral 40. The amplifier includes a series resistance element 42 and a parallel variable resistance element 43. The multiplying amplifier modifies the signal or impulse by an amount equal to the constant I which is equal to the polar mass moment of inertia of the test apparatus. The signal from the multiplying amplifier 40 is thereafter equal in value to the torque developed by the clutch sample. In other words, the signal which is equivalent to the angular acceleration "α" has now been multiplied through the multiplying amplifier by the factor "I" which is equal to the polar mass moment of inertia, so that the signal or impulse in conductor 45 now provides a direct value of the torque "T." This signal in conductor 45 is transmitted to the recorder 36 and a continuous history of the torque is recorded in parallel with the velocity. Thus, there is provided a dual recording of velocity and torque with the torque being that exerted at the recorded velocity.

By inspecting the test pattern, one skilled in the art can note the respective torques developed by the test sample and the associated velocity at which the torque developed, thus giving a very valuable analysis of the characteristics of the friction material, since there is established how the friction material acts during a stop and at the precise stage of the stop; viz., toward the end, midpoint etc.

Referring to FIGURE 5, the test clutch 10 and brake clutch 29 (which are constructed in the same manner) are provided in the apparatus adjacent the motor 20 and at the far left end of the apparatus, FIGURE 1. Assuming that the structure shown in FIGURE 5 is the clutch, it is constructed as follows:

The axle 22 has a flange which is connected with flywheel 46. The clutch plate 47 is spline fitted on the end of spline shaft 51 which is coupled to the shaft 12 (not shown but refer to FIGURE 1 for reference to shaft 12). Pressure springs 48 are used to bias pressure plate 53 into engagement with the clutch plate 47 which has the lining specimens mounted thereon. A cover plate 55 is secured to the flywheel 46 and is rotatable with the flywheel. The friction material 54 mounted on the clutch plate is clamped between the flywheel 46 and the pressure plate 53 by the springs 48. This engagement is released by actuation of the air cylinder 49 which is operated by the solenoid 78 (FIGURE 6). The air cylinder moves the lever 59 which is pivoted on the pivot 61 to move the trunnion mounted bearing 50 toward the right. The bearing pushes against release levers 52, thus withdrawing the pressure plate 53 against the resistance of springs 48.

The same structure is used for the brake clutch, in which case the drive shaft is the remote left end of shaft 12 and the splined shaft 51 instead of being rotatable is held fast in support 32 (FIGURE 1).

Referring next to FIGURE 3, there is shown an actual test record which was obtained from a testing run of the apparatus shown in FIGURES 1 and 2. Reading from left to right, the inertia wheel started out from rest and is therefore originally at zero r.p.m. Previous to clutch engagement, of course, the acceleration or torque (both of these values being equivalent) is zero when the clutch is disengaged.

The test apparatus is then actuated by engaging test clutch 10 and at the initial engagement the inertia wheel will begin to "spin up" to synchronous speed by the action of the torque developed through the test sample. As shown in the extreme lefthand part of FIGURE 3, the torque increases very sharply at first and then reduces. This is explainable on the basis of the damping springs in the clutch. When the clutch is first engaged, the springs act as solid members and develop considerable torque initially. Thereafter, the springs begin to compress and this has the effect of reducing the torque of the clutch considerably producing substantial clutch slippage. When the springs have become fully compressed, the torque increases very sharply and approaches maximum torque at which a series of vibrations occur.

The peak torque is reached as the inertia means approaches synchronous speed. Just prior to synchronous speed of the inertia means, the torque falls off sharply, but instead of reducing to zero, the torque value goes through several high amplitude low frequency oscillations as shown in FIGURE 3. These oscillations are damped out by the springs in the clutch, and it is quite important to keep these oscillations to a minimum in order to prevent chatter of the clutch.

Following the engagement operation, at which time the inertia load 14 is rotating at its top speed, the clutch is disengaged and the brake 29 is applied to decelerate the inertia means to zero velocity. When the brake is applied, the instruments, shown schematically in FIGURE 2, record the deceleration and "negative torque" (this being a torque opposite that developed by the clutch). Because the braking torque is oppositely directed from that of the clutch, it appears above the line of zero torque rather than below it to indicate that the two torque forces are opposed, the one being exerted to "spin up" the inertia means and the other being used for decelerating the inertia means.

When the brake is first applied, the torque force peaks momentarily, reduces to zero, then builds up to a maximum value. At this maximum torque, there is a number of high frequency low amplitude variations of torque. Approaching zero rotational speed, these vibrations are of relatively high amplitude and are damped out. These frequencies provide some measure of the likelihood of the brake sample producing brake chatter.

Immediately following the brake application, the clutch is again applied to recycle the test for the clutching operation. It should be noted that after the inertia means is brought up to synchronous speed the clutch is run for a short while at this speed to study what transpires during clutch engagement and to allow for cooling of the test clutch. There is shown in the test record sample (by the rippled lines separating the clutch and succeeding brake application) very low amplitude oscillation which indicates some clutch slippage.

At the bottom of the test record sample are a number of small space markings which are intended to indicate repeated time intervals. Each of these marks are spaced apart automatically to indicate time increments in tenths of a second. By counting the number of intervals, the total duration of a brake or clutch operation can be determined. Also starting from the beginning of the operation, the torque value can be had and identified at a particular stage of operation as well as the corresponding velocity of the flywheel. As a result, the torque can be pin pointed at the various stages in operation, this being very valuable to determine the effect of heat, speed, wear etc. on the friction sample.

Referring to FIGURE 6, the apparatus can be controlled both manually and electrically in the following manner:

There are two supply conductors 58 and 60 and a ground line 62. The supply line 60 has the usual fuse 63 and control power switch 64. An indicator light 66 is used to show that the circuit is on.

The test apparatus is made either manual or automatic in operation by means of a switch 68 which, in its "up" position, will make the operation nonautomatic, and in the "down" position provides automatic operation. The switch 68 has in conjunction therewith a number of interlocked switches 70, 72 and 74.

Describing first the manual operation, with the switch 68 lifted to manual, the switch 70 is closed, the switch 72 opened and the switch 74 closed. In this position, the various timers and counters are nonoperative. Thereafter, the test clutch 10 associated with solenoid 78 is operated by manually closing the switch 76 which operates the solenoid 78.

In order to record the clutch operation, the switch 80 is operated to energize the relay 82 which closes contacts 84 to operate the recorder drive 86. The switch 76 is closed for as long as desired, preferably until the flywheel is brought up to synchronous speed and held there to obtain a recording for as long as necessary to get a proper evaluation of the liner performance. Thereafter, the test clutch switch 76 is opened and the brake clutch switch 88 is operated to energize the brake clutch solenoid 90, this solenoid being combined with the brake clutch 29 in the same manner as described with the clutch 10. It should be noted that the test clutch and brake clutch lines are interconnected by means of switches 92 and 94 so that only one or the other of the solenoids 78, 90 can be operated. If both the test clutch switch 76 and the brake clutch switch 88 are simultaneously operated then neither solenoid is energized because the switches 92 and 94 are opened. The switch 80 to the recorder is manually operated when the brake clutch switch 88 is operated in order to obtain a reading of the torque, similar to the record obtained with the test clutch operation.

For automatic operation, the switch 68 is moved to the position indicated in FIGURE 6 and the interlocked switches 70, 72 and 74 are concurrently moved to the positions indicated. The recorder drive switch 80 is also moved to automatic as shown in FIGURE 6. The timers 96, 98, 100 are set to provide the selected interval of brake and clutch engagement, and the interval between successive cycles. The time of the clutch engagement is determined by timer 96 and is typically in the order of three seconds, timer 98 determines the length of time for an overall cycle and is typically five seconds (three seconds overlap with timer 96) and timer 100 determines the interval or length of time (typically one second) between successive overall cycles.

There are two "in series" counters 102 and 104 which determine the total number of cycles which the machine will automatically run and thereafter become deactuated. The selected number of cycles is set on the counters 102, 104. Once the apparatus is set up with the selected time intervals and test number, the starting switch 106 is closed and current will pass through the counter 104 to actuate the relay 108. Contact 109 is then operated by relay 108, which permits current to pass through timers 100, 98 and 96 and thereafter operate relay 110 to close the normally open switches or contacts 112, 114, 116 (116 operating the recorder) and open the normally closed contact 118.

When contact 112 is closed, the impulse counter 120 is operated to record accumulatively the number of cycles. When contact 114 is closed, the test clutch solenoid 78 is operated to produce an engagement of the clutch 10. The contact 116, when closed, operates the relay 82, which in turn closes contact 84, to start the recorder drive 86 to record the torque developed by clutch 10 during its engagement.

Timer 96 permits continued energization of relay 110 for the desired time period and thereafter de-energizes the relay 110, opening the contacts 112 and 114 and 116 and allowing closure of the normally closed contact 118. The moment these contacts are operated, as described, the test clutch solenoid is deactuated and the brake clutch solenoid 90 is operated to decelerate the flywheel. Overlapping with the time period of timer 96 is the timer 98 which continues to time until the flywheel is brought to a complete stop. After the overall timer 98 has sequenced, its last functional purpose is to initiate interval timer 100, which then delays the recycling until timers 96 and 98 have been given an opportunity to reset to their original positions.

Once the interval timer has run its course, the timer 96 is reactuated to energize the relay 110 and the cycle of test clutch solenoid operation is repeated; the overall time period begins and runs for the allotted period; and the timer 96 deactuates relay 110. This repeating cycle of clutch-brake-pause continues until the cycling is terminated by the counters.

For each of these successive cycles, the impulse counter 120 will add one digit, thus indicating the total lapsed cycles.

Once the counters 102 and 104 have reached the selected number of cycles, the entire apparatus is shut down in the following manner:

The counters 102, 104 have received the count through the contacts 120, 122, which are closed by operation of relay 110. Once the counters 102 and 104 have reached the selected number of impulses, the relay 108 is deactuated, opening contact 109, and interrupting current through the timers 96, 98 and 100, and thus terminating operation of the apparatus.

With reference to FIGURE 4, the recording is influenced by operation of the timers. During the period of time from zero to three seconds (labeled clutch engagement), the timer 96 is the significant timing element. From time interval three seconds to time interval five seconds, the timer 98 is the significant timer, that is, timer 98, which is overlapping with timer 96, determines the overall cycle and then as its last function, timer 98 operates timer 100, which then determines the time interval delay before the next succeeding cycle is started. This interval as shown in FIGURE 4 is about one second. Timer 100, as its last significant function, reinitiates the cycle by restarting timer 96 and 98 to renew the cycle of apparatus operation. As indicated, the entire operation is six seconds.

Referring now to FIGURE 3, the recorder drive is driven synchronously with the test clutch so that the recorded time intervals are regular. Once the test clutch solenoid is deactuated, and the brake clutch solenoid operated, the recorder drive is deactuated but continues to run by its inertia and thereby records the brake clutch operation. The time intervals, however, are condensed so that the test pattern is somewhat distorted. If it is desired, however, the recorder drive can be made synchronous with brake operation, but this is not considered as significant information as a completely accurate pattern of the test clutch operation. The recorder drive is completely deactuated during the interval from one cycle to the next in order to conserve the recording paper.

The testing arrangement which has been described provides the investigator with a very refined analytical tool which permits detailed investigation into the performance of the lining specimen.

The original cost of the apparatus is greatly reduced and it can be operated at very low cost. The entire operation is independent of the usual slip rings and strain gauges.

While the invention has been described in connection with testing of brakes and clutch materials, those skilled in the art will immediately perceive other applications of the invention. Also, it is anticipated that those skilled in the art can make numerous modifications and revisions of the present invention without departing from the spirit and scope of the invention. It is intended to include such variations and revisions of the invention within the scope of the following claims.

I claim:

1. In a dynamometer and the like for testing torque transmitting devices: a first shaft suitably journalled for rotation and having a mass which provides a generally predetermined polar moment of inertia to said shaft, a second shaft suitably journalled and power driven, a first torque transmitting device operatively positioned as a clutch between said first and second shafts, said first torque transmitting device having a friction member driven by said second shaft and another friction member attached to said first shaft, said friction members having friction surfaces adapted to effect a frictional drive therebetween, a second torque transmitting device operatively positioned as a brake for said first shaft, said second torque transmitting device having a rotor member driven by said first shaft and a generally immovable stator member, said rotor and stator members having friction surfaces which engage each other, first means for generally simultaneously engaging said friction surfaces of said first device while disengaging said friction surfaces of said second device and for disengaging said friction surfaces of said first device while engaging said friction surfaces of said second device, means for sensing a change in speed of said first shaft, and means for causing said first means to cycle, whereby identical first and second torque transmitting devices can be simultaneously and continually tested during both the speeding up and slowing down of said inertia mass and/or a direct comparison can be made between different torque transmitting devices.

2. In a dynamometer and the like for testing torque transmitting devices: a first shaft suitably journalled for rotation and having a mass which provides a generally predetermined polar moment of inertia to said shaft, a second shaft suitably journalled and power driven, a first torque transmitting device operatively positioned as a clutch between said first and second shafts, said first device having a friction member driven by said second shaft and another friction member attached to said first shaft, said friction members having friction surfaces adapted to effect a frictional drive therebetween, a second torque transmitting device operatively positioned as a brake for said first shaft, said second device having a rotor member driven by said first shaft and a generally immovable stator member, said rotor and stator members having friction surfaces which engage each other, an engagement timer having cyclic means and a pair of normally open and a pair of normally closed electrical contacts, said timer closing said normally open contacts and opening said normally closed contacts when said cyclic means is tripped to start said cyclic means, and thereafter running for a predetermined time after which it opens said normally open contact and closes said normally closed contact and deenergizes itself until said cyclic means is again tripped, adjustable over-all cyclic timing means for tripping said engagement timer at the start of its cycle and thereafter running for an adjustable period of time after which said adjustable over-all timing means again trips itself to start its cycle over again, means energized by said normally open contacts of said engagement timer for engaging said friction surfaces of one of said first and second torque transmitting devices, and means energized by said normally closed contacts for engaging the friction surfaces of the other of said first and second torque transmitting devices, means for sensing a change in speed of said first shaft, whereby torque transmitting devices can be simultaneously and continually tested during both the speeding up and slowing down of said inertia mass and the temperature of the torque transmitting devices can be controlled by adjusting the length of the cycle of the over-all timer.

3. In a dynamometer and the like for testing torque transmitting devices: a first shaft suitably journalled for rotation and having a mass which provides a generally predetermined polar moment of inertia to said shaft, a second shaft suitably journalled and power driven, a first torque transmitting device operatively positioned as a clutch between said first and second shafts, said first device having a friction member driven by said second shaft and another friction member attached to said first shaft, said friction members having friction surfaces adapted to effect a frictional drive therebetween, a second torque transmitting device operatively positioned as a brake for said first shaft, said second device having a rotor member driven by said first shaft and a generally immovable stator member, said rotor and stator members having friction surfaces which engage each other, an engagement timer having cyclic means and a pair of normally open and a pair of normally closed electrical contacts, said timer closing said normally open contacts and opening said normally closed contacts when said cyclic means is tripped to start said cyclic means, and thereafter running for a predetermined time after which it opens said normally open contacts and closes said normally closed contacts and deenergizes itself until said cyclic means is again tripped, an over-all timer having cyclic means which when tripped runs for a generally predetermined period and then deenergizes itself, said engagement timer being tripped at the start of said over-all timer cycle, and an adjustable interval timer which when tripped runs for an adjustable period of time and shuts itself off, said interval timer tripping said over-all timer at the end of its cycle, and said over-all timer tripping said interval timer at the end of the cycle of said over-all timer, means energized by said normally open contacts of said engagement timer for engaging said friction surfaces of one of said first and second torque transmitting devices, means energized by said normally closed contacts for engaging said friction surfaces of the other of said first and second torque transmitting devices, and means for sensing a change in speed of said first shaft, whereby torque transmitting devices can be simultaneously and continually tested during both the speeding up and slowing down of said inertia mass and the temperature of the torque transmitting devices can be controlled by adjusting the length of the cycle of the interval timer.

4. In a dynamometer and the like for testing torque transmitting devices: a first shaft suitably journalled for rotation and having a mass which provides a generally predetermined polar moment of inertia to said shaft, a second shaft suitably journalled and power driven, a first torque transmitting device operatively positioned as a clutch between said first and second shafts, said first device having a friction member driven by said second shaft and another friction member attached to said first shaft, said friction members having friction surfaces adapted to effect a frictional drive therebetween, a second torque transmitting device operatively positioned as a brake for said first shaft, said second device having a rotor member driven by said first shaft and a generally immovable stator member, said rotor and stator members having friction surfaces which engage each other, an engagement timer having cyclic means and a pair of normally open and a pair of normally closed electrical contacts, said timer closing said normally open contacts and opening said normally closed contacts when said cyclic means is tripped to start said cyclic means, and thereafter running for a predetermined time after which it opens said normally open contact and closes said normally closed contact and deenergizes itself until said cyclic means is again tripped, an over-all timer having cyclic means which when tripped runs for a generally predetermined period and then deenergizes itself, said engagement timer being tripped at the start of said over-all timer cycle, and an adjustable interval timer which when tripped runs for an adjustable period of time and shuts itself off, said interval timer tripping said over-all timer at the end of its cycle, and said over-all timer tripping said interval timer at the end of the cycle of said over-all timer, means energized by said normally open contacts of said engagement timer for engaging said friction surfaces of one of said first and second torque transmitting devices, means energized by said normally closed contacts for engaging said friction surfaces of the other of said first and second torque transmitting devices, a tachometer driven by said first shaft, said tachometer providing an output signal which is a predetermined function of the speed of said shaft, means differentiating said output signal to provide a signal which is an indication of the instantaneous torque exerted on said inertia mass by said torque transmitting devices, a power driven recorder having appreciable inertia for moving graph paper as a function of time, means for simultaneously recording the instantaneous output signal of said tachometer and the output signal of said differentiating means, and means causing said recorder to be energized only during engagement of the friction surfaces of one of said torque transmitting devices, whereby torque transmitting can be simultaneously and continually tested during both the speeding up and slowing down of said inertia mass and the temperature of the torque transmitting devices can be controlled by adjusting the length of the cycle of the interval timer.

5. In a dynamometer and the like for testing torque transmitting devices: a first shaft suitably journalled for rotation and having a mass which provides a generally predetermined polar moment of inertia to said shaft, a second shaft suitably journalled and power driven, a first torque transmitting device operatively connected as a clutch between said first and second shafts, said first torque transmitting device having a friction member driven by said second shaft, and another friction member attached to said first shaft, said friction members having friction surfaces adapted to effect a frictional drive therebetween, a second torque transmitting device operatively positioned as a brake for said first shaft, said second torque transmitting device having a rotor member driven by said first shaft and a generally immovable stator member, said rotor and stator members having friction surfaces which engage each other, first means for engaging said friction surfaces of said first device while disengaging said friction surfaces of said second device and for disengaging said friction surfaces of said first device while engaging said friction surfaces of said second device, means for causing said first means to cycle, and a recorder having graph paper which is moved as a function of time, said recorder recording the instantaneous rate of change of the velocity of said first shaft during the engagement of at least one of said torque transmitting devices.

6. In a dynamometer and the like for testing torque transmitting devices: a first shaft suitably journalled for rotation and having a mass which provides a generally predetermined polar moment of inertia to said shaft, a second shaft suitably journalled and power driven, a first torque transmitting device operatively connected as a clutch between said first and second shafts, said first torque transmitting device having a friction member driven by said second shaft, and another friction member attached to said first shaft, said friction members having friction surfaces adapted to effect a frictional drive therebetween, a second torque transmitting device operatively positioned as a brake for said first shaft, said second torque transmitting device having a rotor member driven by said first shaft and a generally immovable stator member, said rotor and stator members having friction surfaces which engage each other, first means for engaging said friction surfaces of said first device while disengaging said friction surfaces of said second device and for disengaging said friction surfaces of said first device while engaging said friction surfaces of said second device, means for causing said first means to cycle, and a power driven recorder for moving graph paper as a function of time, said recorder having an appreciable amount of inertia which continues to move the graph paper for a predetermined period when the recorder is de-energized, means for recording the rate of change of velocity of said first shaft on said graph paper, and means for power actuating said recorder only during the engagement of one of said torque transmitting devices, whereby a uniform recordation of torque is provided during the engagement of one of said torque transmitting devices, and a condensed recordation of torque is provided during the engagement of the other of said torque transmitting devices.

References Cited in the file of this patent

UNITED STATES PATENTS

| | | |
|---|---|---|
| 1,872,495 | Pfeiffer | Aug. 16, 1932 |
| 2,011,783 | Thomas | Aug. 20, 1935 |
| 2,084,547 | Allen | June 22, 1937 |
| 2,449,091 | Starling | Sept. 14, 1948 |
| 2,531,228 | MacGeorge | Nov. 21, 1950 |
| 2,637,204 | Short | May 5, 1953 |
| 2,736,196 | Knowles | Feb. 28, 1956 |
| 2,882,721 | Harned et al. | Apr. 21, 1959 |
| 2,944,419 | Paalu | July 12, 1960 |
| 2,949,029 | Bayles et al. | Aug. 16, 1960 |